(12) United States Patent
Aramaki et al.

(10) Patent No.: US 12,094,627 B2
(45) Date of Patent: Sep. 17, 2024

(54) WIRING MEMBER INCLUDING SHEETS PARTIALLY FIXED ALONG LONGITUDINAL DIRECTION OF WIRE-LIKE TRANSMISSION MEMBER PROVIDED BETWEEN THE SHEETS {P65628 06162836.DOC} 3

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Mie (JP); Yasuo Omori, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 166 days.

(21) Appl. No.: 17/768,133

(22) PCT Filed: Aug. 28, 2020

(86) PCT No.: PCT/JP2020/032508
§ 371 (c)(1),
(2) Date: Apr. 11, 2022

(87) PCT Pub. No.: WO2021/079616
PCT Pub. Date: Apr. 29, 2021

(65) Prior Publication Data
US 2023/0024714 A1    Jan. 26, 2023

(30) Foreign Application Priority Data
Oct. 23, 2019   (JP) .................................. 2019-192577

(51) Int. Cl.
*H01B 7/18*    (2006.01)
*B60R 16/02*   (2006.01)
(Continued)

(52) U.S. Cl.
CPC ....... *H01B 7/0823* (2013.01); *B60R 16/0207* (2013.01); *H01B 7/18* (2013.01); *H01B 7/40* (2013.01)

(58) Field of Classification Search
CPC .... H01B 7/0823; H01B 7/18; B60R 16/0215; B60R 16/0207
(Continued)

(56) References Cited

U.S. PATENT DOCUMENTS 3,459,879 A * 8/1969 Gerpheide ............... H01B 7/08
                                                 174/117 FF
3,733,428 A * 5/1973 Fry ..................... H01B 7/0846
                                                 156/290
(Continued)

FOREIGN PATENT DOCUMENTS

CN      102280181      12/2011
CN      102870171       1/2013
(Continued)

OTHER PUBLICATIONS

Japan Office Action issued in Japan Patent Application No. 2019-192577, dated Sep. 27, 2022, together with an English translation thereof.
(Continued)

*Primary Examiner* — Timothy J Thompson
*Assistant Examiner* — Michael F McAllister
(74) *Attorney, Agent, or Firm* — GREENBLUM & BERNSTEIN, P.L.C.

(57) ABSTRACT

A wiring member includes: a plurality of wire-like transmission members including a first wire-like transmission
(Continued)

member and a second wire-like transmission member; and a plurality of sheets including a first sheet and a second sheet stacked on each other, wherein the first wire-like transmission member is fixed to the first sheet, the second wire-like transmission member is fixed to the second sheet, and at least one fixing position between the first sheet and the second sheet is partially provided along a longitudinal direction of the wire-like transmission members.

9 Claims, 6 Drawing Sheets

(51) Int. Cl.
  *H01B 7/08* (2006.01)
  *H01B 7/40* (2006.01)
(58) Field of Classification Search
  USPC ........................................... 174/70 R
  See application file for complete search history.

(56) References Cited

U.S. PATENT DOCUMENTS

| | | | | |
|---|---|---|---|---|
| 3,736,366 | A * | 5/1973 | Wittenberg | H01B 11/02 |
| | | | | 439/387 |
| 3,757,029 | A * | 9/1973 | Marshall | H01B 7/08 |
| | | | | 174/117 FF |
| 3,833,755 | A * | 9/1974 | Soelberg | H01B 7/38 |
| | | | | 174/117 F |
| 4,045,750 | A * | 8/1977 | Marshall | H01P 5/12 |
| | | | | 333/236 |
| 4,138,193 | A * | 2/1979 | Olszewski | G02B 6/4403 |
| | | | | 174/117 F |
| 4,149,026 | A * | 4/1979 | Fritz | H01B 7/0838 |
| | | | | 174/32 |
| 4,217,155 | A * | 8/1980 | Fritz | H01B 7/0838 |
| | | | | 428/114 |
| 4,355,865 | A * | 10/1982 | Conrad | G02B 6/4403 |
| | | | | 156/303.1 |
| 4,831,278 | A * | 5/1989 | Ueda | H05K 7/06 |
| | | | | 174/72 A |
| 5,502,287 | A * | 3/1996 | Nguyen | H01B 7/0846 |
| | | | | 174/117 A |
| 6,340,199 | B1 * | 1/2002 | Fukumoto | E05F 15/44 |
| | | | | 296/155 |
| 7,161,085 | B2 * | 1/2007 | Sugimoto | H02G 3/305 |
| | | | | 174/117 F |
| 2012/0298395 | A1 | 11/2012 | Gundel | |
| 2019/0166713 | A1 * | 5/2019 | Chen | H01R 12/7076 |
| 2019/0275754 | A1 | 9/2019 | Kato et al. | |
| 2020/0141518 | A1 | 5/2020 | Nakano et al. | |

FOREIGN PATENT DOCUMENTS

| | | |
|---|---|---|
| CN | 104183312 | 12/2014 |
| CN | 108281225 | 7/2018 |
| CN | 110228211 | 9/2019 |
| JP | 4-46319 U | 4/1992 |
| JP | 2002-208325 | 7/2002 |
| JP | 2012-94375 | 5/2012 |
| JP | 2013-169117 | 8/2013 |
| JP | 2019-004679 | 1/2019 |
| JP | 6579297 | 9/2019 |

OTHER PUBLICATIONS

China Office Action issued in China Patent Application No. 202080073155.1, dated Oct. 7, 2023, together with English translation thereof.
Japan Office Action issued in Japan Patent Application No. 2022-187974, dated Sep. 5, 2023, together with an English translation thereof.
International Search Report issued in International Patent Application No. PCT/JP2020/032508, dated Oct. 20, 2020, along with an English translation thereof.
International Preliminary Report on Patentability issued in International Patent Application No. PCT/JP2020/032508, dated May 5, 2022, along with an English translation thereof.
Office Action issued in China Patent Application No. 202080073155.1, dated May 15, 2024, together with English translation thereof.

* cited by examiner

F I G. 9
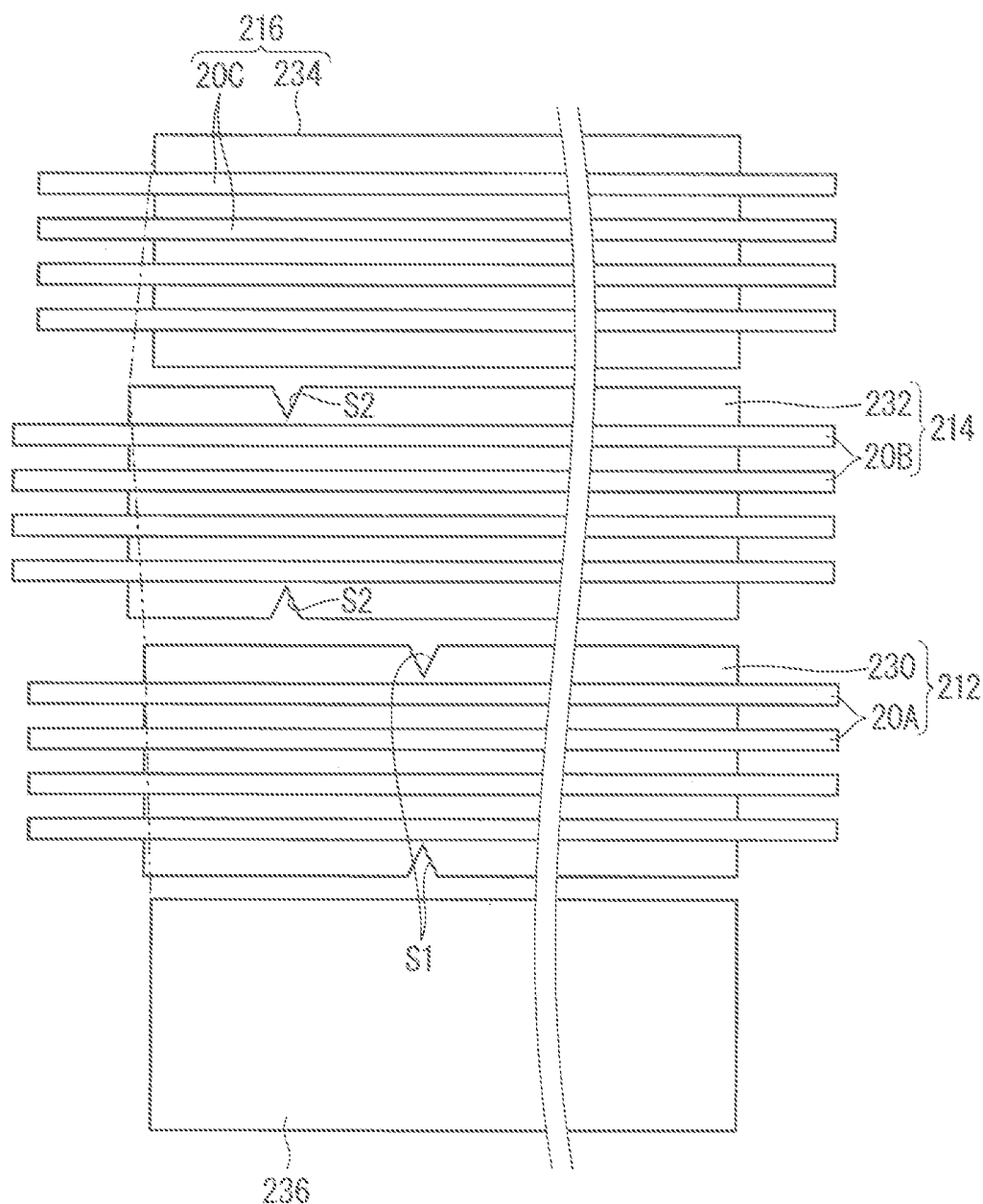

WIRING MEMBER INCLUDING SHEETS PARTIALLY FIXED ALONG LONGITUDINAL DIRECTION OF WIRE-LIKE TRANSMISSION MEMBER PROVIDED BETWEEN THE SHEETS {P65628 06162836.DOC} 3

TECHNICAL FIELD

The present disclosure relates to a wiring member.

BACKGROUND ART

Patent Document 1 discloses a wire harness in which electrical wires are sandwiched between two sheet materials stacked on each other to be flatly formed as a whole. Patent Document 1 discloses that the two stacked sheet materials are fixed by welding, for example, at positions of both edge portions.

PRIOR ART DOCUMENTS

Patent Documents

Patent Document 1: Japanese Patent Application Laid-Open No. 2019-004679

SUMMARY

Problem to be Solved by the Invention

It is desired that a dimension difference between the stacked sheets is absorbed in a wiring member.

Accordingly, an object is to provide a technique capable of absorbing a dimension difference of stacked sheets.

Means to Solve the Problem

A wiring member according to the present disclosure is a wiring member including: a plurality of wire-like transmission members including a first wire-like transmission member and a second wire-like transmission member; and a plurality of sheets including a first sheet and a second sheet stacked on each other, wherein the first wire-like transmission member is fixed to the first sheet, the second wire-like transmission member is fixed to the second sheet, and at least one fixing position between the first sheet and the second sheet is partially provided along a longitudinal direction of the wire-like transmission members.

Effects of the Invention

According to the present disclosure, the sheets can be appropriately stacked easily.

BRIEF DESCRIPTION OF DRAWINGS

FIG. 9 is an explanation diagram illustrating a manufacture of the wiring member according to the embodiment 3.

DESCRIPTION OF EMBODIMENT(S)

Description of Embodiment of Present Disclosure

Figure 1:
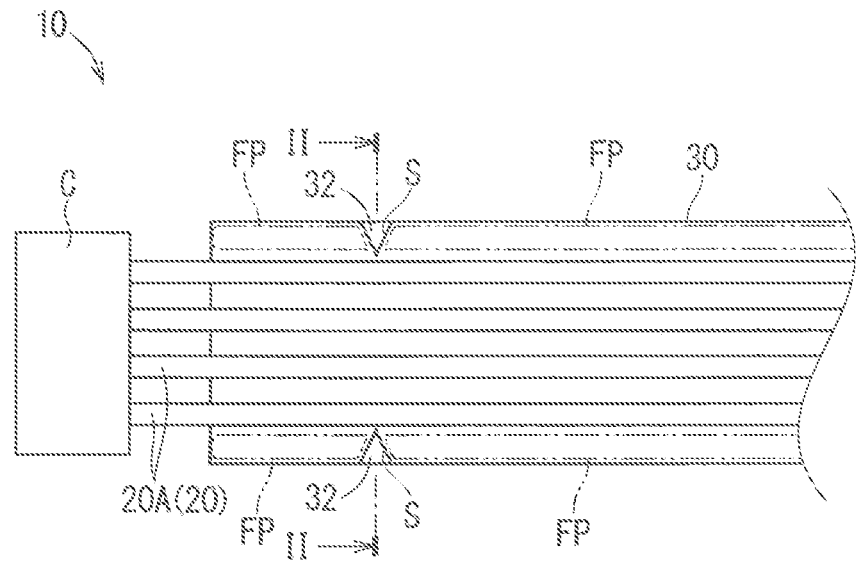
FIG. 1 is a plan view illustrating a wiring member according to an embodiment 1.

Embodiments of the present disclosure are listed and described firstly.

A wiring member according to the present disclosure is as follows.

(1) A wiring member includes: a plurality of wire-like transmission members including a first wire-like transmission member and a second wire-like transmission member; and a plurality of sheets including a first sheet and a second sheet stacked on each other, wherein the first wire-like transmission member is fixed to the first sheet, the second wire-like transmission member is fixed to the second sheet, and at least one fixing position between the first sheet and the second sheet is partially provided along a longitudinal direction of the wire-like transmission members. A dimension difference between the sheets can be absorbed in a position where the sheets are not fixed to each other.

(2) A wiring member includes: a wire-like transmission member, and a plurality of sheets including a first sheet and a second sheet stacked on each other, wherein the wire-like transmission member is fixed to the first sheet, the second sheet covers the wire-like transmission member from a side opposite to the first sheet, and at least one fixing position between the first sheet and the second sheet is partially fixed along a longitudinal direction of the wire-like transmission member. A dimension difference between the sheets can be absorbed in a position where the sheets are not fixed to each other.

(3) It is also applicable that the plurality of sheets include a sheet with slit in which a slit is formed in a side edge, at least one of the first sheet and the second sheet is the sheet with slit, and a side edge of the first sheet and a side edge of the second sheet are fixed to each other. Accordingly, a position where the sheets are not fixed to each other can be easily set in a position of a slit, and the position where the sheets are not fixed to each other can be easily managed.

(4) It is also applicable that both the first sheet and the second sheet are the sheets with slit, and a position of the slit formed in the first sheet and a position of the slit formed in the second sheet are provided apart from each other along the longitudinal direction. The positions of the slits are provided apart from each other, thus the positions where the sheets are not fixed to each other can be easily provided apart from each other (5) The first sheet and the second sheet may be fixed to each other in positions on both sides of the slit along the longitudinal direction. Accordingly, a range of fixing the first sheet and the second sheet can be increased.

(6) The first sheet and the second sheet may be fixed to each other only in one of positions on both sides of the slit along the longitudinal direction. Accordingly, the slit can serve as a guideline of a portion where the first sheet and the second sheet are fixed to each other and a portion where they are not fixed.

(7) The plurality of sheets may include two sheet portions stacked and fixed in a position of the slit in the sheet with slit. Accordingly, suppressed is that a portion of the side edge is opened in the position of the slit in the sheet with slit.

(8) It is also applicable that when a sheet in the plurality of sheets located as an uppermost layer is an uppermost layer sheet, a sheet located as a lowermost layer is a lowermost layer sheet, and at least one sheet located between the uppermost layer and the lowermost layer is at least one intermediate layer sheet, each of the uppermost layer sheet and the lowermost layer sheet is a regular sheet which does not have the slit in the side edge, and the at least one intermediate layer sheet is the sheet with slit. Accordingly, it can be suppressed that a portion of the side edge is opened in the wiring member.

(9) It is also applicable that the plurality of fixing positions are provided at intervals along the longitudinal direction, and at least one of the first sheet and the second sheet loosens between the plurality of fixing positions. Accordingly, even in a case where dimensions of the first sheet and the second sheet are different from each other, loosening portions are provided in the sheets, thus the difference of the dimensions can be easily absorbed.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
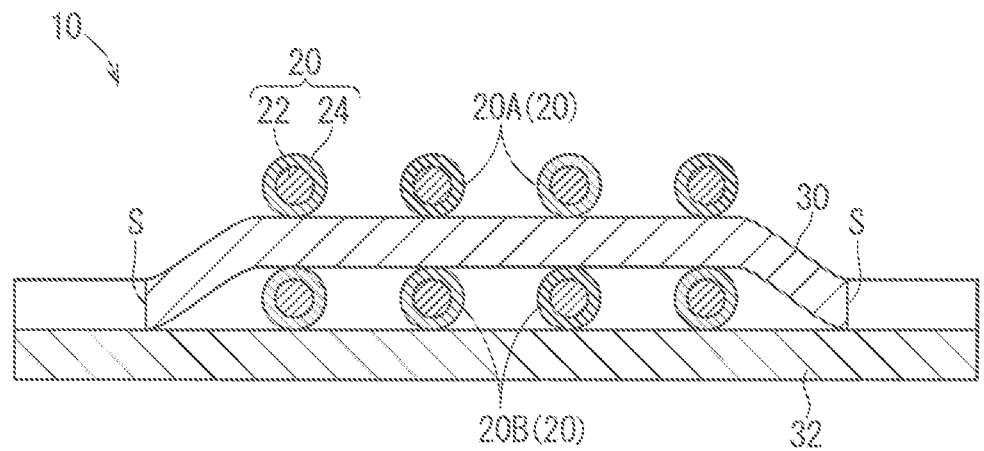
FIG. 2 is a cross-sectional view of the wiring member cut along a II-II line in FIG. 1.
Figure 3:
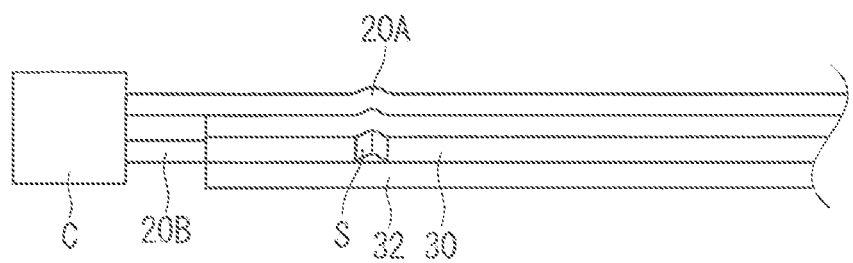
FIG. 3 is a side view illustrating a wiring member according to the embodiment 1.
Figure 4:
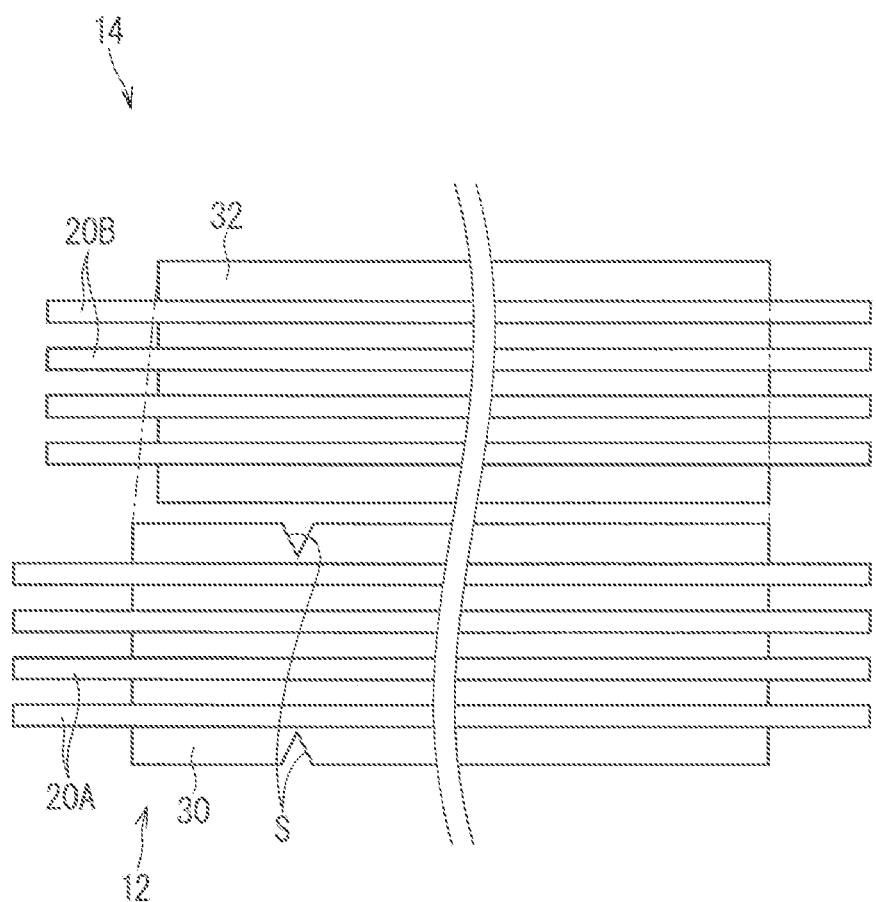
FIG. 4 is an explanation diagram illustrating a manufacture of the wiring member according to the embodiment 1.

A wiring member according to an embodiment 1 is described hereinafter. FIG. 1 is a plan view illustrating the wiring member 10 according to the embodiment 1. FIG. 2 is a cross-sectional view of the wiring member cut along a II-II line in FIG. 1. FIG. 3 is a side view illustrating the wiring member 10 according to the embodiment 1. FIG. 4 is an explanation diagram illustrating a manufacture of the wiring member 10 according to the embodiment 1.

The wiring member 10 includes a wire-like transmission member 20 and a plurality of sheets 30 and 32. The plurality of wire-like transmission members 20 are provided. The plurality of wire-like transmission members 20 include a first wire-like transmission member 20A and a second wire-like transmission member 20B. The plurality of sheets 30 and 32 include a first sheet 30 and a second sheet 32. The first sheet 30 and the second sheet 32 are stacked on each other. The first wire-like transmission member 20A is fixed to the first sheet 30. The second wire-like transmission member 20B is fixed to the second sheet 32.

The wiring member 10 can also be considered a plurality of wiring bodies 12 and 14 stacked on each other. The wiring body 12 includes the wire-like transmission member 20 and the sheet 30 to which the wire-like transmission member 20 is fixed and the wiring body 14 includes the wire-like transmission member 20 and the sheet 32 to which the wire-like transmission member 20 is fixed. For example, the first wire-like transmission member 20A fixed to the first sheet 30 is the first wiring body 12. The second wire-like transmission member 20B fixed to the second sheet 32 is the second wiring body 14. The wiring member 10 includes the first wiring body 12 and the second waring body 14 stacked on each other.

Each wire-like transmission member 20 is a wire-like member transmitting an electrical power or light, for example. The sheets 30 and 32 are formed into a flat shape as a whole. The plurality of wire-like transmission members 20 are fixed to the sheets 30 and 32, thus the wiring bodies 12 and 14 are kept in a flat state.

The plurality of wire-like transmission members 20 are assumed to be members connecting components in a vehicle. A connector C, for example, is provided on an end portion of the wire-like transmission member 20. This connector C is connected to a connector provided in the other side component, thus the wire-like transmission member 20 is connected to the other side component. That is to say, the present wiring member 10 is used as the wiring member 10 electrically connecting various types of component in a vehicle, for example (or connecting them so that they can perform optical communication). The connector C may be fixed to the sheets 30 and 32.

A route of the wire-like transmission member 20 is set in accordance with a position of a component to which the wire-like transmission member 20 is connected. The plurality of wire-like transmission members 20 are fixed to the sheets 30 and 32, thus the plurality of wire-like transmission members 20 are kept in a form following a wiring route corresponding to a position of a component as a connection destination of each wire-like transmission member 20. The plurality of wire-like transmission members 20 may be fixed to the sheets 30 and 32 in a state where a branch wire part is branched from a main wire part. The sheets 30 and 32 may also be formed in a shape in which a portion to which the branch wire part is fixed is branched from a portion to which the main wire part is fixed.

The wire-like transmission member 20 may be a wire-like member transmitting an electrical power or light, for example, as described above. For example, the wire-like transmission member 20 may be a general wire having a core wire 22 and a covering layer 24 around the core wire 22, or may also be a bare wire, a shielded wire, a twisted wire, an enamel wire, a nichrome wire, or an optical fiber.

The wire-like transmission member 20 transmitting the electrical power may be various kinds of signal lines or various kinds of power lines. Some of the wire-like transmission members 20 transmitting the electrical power may be used as an antenna or coil, for example, transmitting or receiving a signal or electrical power to or from a space.

The wire-like transmission member 20 may be a single wire-like object or a composite object of a plurality of wire-like objects (a twisted wire and a cable made up of a plurality of wire-like objects covered by a sheath).

Description herein is based on an assumption that the wire-like transmission member 20 is an electrical wire.

Each one end of the first wire-like transmission member 20A and the second wire-like transmission member 20B is connected to the same connector C. In the wiring member 10, the first wire-like transmission member 20A and the second wire-like transmission member 20B extend outside from the same end portion of the sheets 30 and 32. Each other end of the first wire-like transmission member 20A and the second wire-like transmission member 20B may be connected to the same connector, or may also be connected to different connectors. The first wire-like transmission member 20A and the second wire-like transmission member 20B may be branched in a midway toward the other end.

The plurality of sheets 30 and 32 include a wire material fixing sheet when classified in a viewpoint of roles. The wire material fixing sheet is a sheet to which the wire-like transmission member 20 is fixed. Herein, both the first sheet 30 and the second sheet 32 are the wire material fixing sheets. The plurality of sheets may include a cover sheet when classified in a viewpoint of roles. The cover sheet is described in detail in an embodiment 2.

The sheets 30 and 32 to which the wire-like transmission member 20 is fixed may be resin sheets. For example, the sheets 30 and 32 may be formed of resin such as polyvinyl chloride (PVC), polyethylene (PE), polypropylene (PP), or polyethylene terephthalate (PET). The sheets 30 and 32 are also considered non-woven clothes or foamed sheets, for example. The sheets 30 and 32 may have a single layer structure, or may also have a multilayer structure. The sheets 30 and 32 may include a metal layer.

A fixing structure of the wire-like transmission member 20 fixed to the sheets 30 and 32 is not particularly limited as long as the wire-like transmission member 20 is fixed to the sheets 30 and 32. Applicable as the fixing state are a contact area fixation and a non-contact area fixation, or both fixations may be used together. Herein, the contact area fixation indicates that a portion where the wire-like transmission member 20 and the sheets 30 and 32 have contact with each other is stuck and fixed. The non-contact area fixation is a fixing state which is not the contact area fixation, and indicates that a sewing thread, a cover, or an adhesive tape presses the wire-like transmission member 20 toward the sheets 30 and 32 or sandwiches the wire-like transmission member 20 and the sheets to keep them in a fixing state. In the description hereinafter, the wire-like transmission member 20 and the sheets 30 and 32 are in the state of the contact area fixation.

Applicable as the configuration of the contact area fixation are a contact area indirect fixation and a contact area direct fixation, or both fixations may also be used together in different regions. Herein, the contact area indirect fixation indicates that the wire-like transmission member 20 and the sheets 30 and 32 are indirectly stuck and fixed via an adhesive agent, a gluing agent, and a double-sided adhesive tape provided therebetween. The contact area direct fixation indicates that the wire-like transmission member 20 and the sheets 30 and 32 are directly stuck and fixed without an intervention of the adhesive agent, for example, which is separately provided. Considered in the contact area direct fixation is that resin included in at least one of the wire-like transmission member 20 and the sheets 30 and 32 is melted, thus the wire-like transmission member 20 and the sheets 30 and 32 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the wire-like transmission member 20 and the sheets 30 and 32 are in the state of the contact area direct fixation by these means. Specifically, when the state of the contact area direct fixation is formed by the ultrasonic welding, for example, the wire-like transmission member 20 and the sheets 30 and 32 are in the state of the contact area direct fixation by the ultrasonic welding.

In the description hereinafter, the wire-like transmission member 20 and the sheets 30 and 32 are in the state of the contact area direct fixation.

Each wire-like transmission member 20 may be fixed to the sheets 30 and 32 at a plurality of positions at intervals along a longitudinal direction. Each wire-like transmission member 20 may be wholly fixed to the sheets 30 and 32 continuously along the longitudinal direction.

The plurality of sheets 30 and 32 may include a sheet with slit when classified in a viewpoint of shapes. The sheet with slit is a sheet in which a slit S is formed on a side edge of a sheet body. The plurality of sheets 30 and 32 may further include a regular sheet when classified in a viewpoint of shapes. The regular sheet is a sheet in which the slit S described above is not formed on the side edge of the sheet body.

At least one of the first sheet 30 and the second sheet 32 may be the sheet with slit. In this case, the side edge of the first sheet 30 and the side edge of the second sheet 32 are fixed at a position other than the slit S. Herein, the first sheet 30 is the sheet with slit, and the second sheet 32 is the regular sheet.

The slit S is formed to extend from the side edge of the sheet body toward a center in a width direction. In the example illustrated in FIG. 1, the slit S is formed on both side edges of the sheet body, but may be formed only in one side edge of the sheet body. A shape of the slit S is not particularly limited. For example, the slit S may have a width. That is to say, a portion of the slit S in the sheets 30 and 32 may be formed into a notched shape. The slit S may not have a width. That is to say, a portion of the slit S in the sheets 30 and 32 may be formed to have a cut line.

Figure 5:
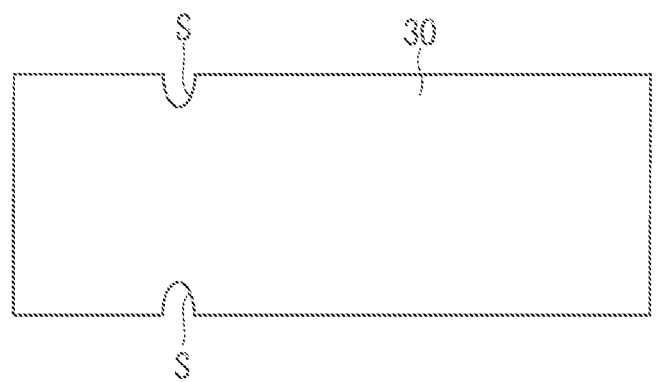
FIG. 5 is a drawing illustrating a modification example of a slit.

When the slit S a width, the shape of the slit S can be appropriately set. In the example illustrated in FIG. 1, the slit S is formed into a triangle shape in a plan view. As illustrated in FIG. 5, a tip of the slit S may be rounded. A shape in which a semicircular portion is provided on an end portion of a rectangular portion, for example, may be applied to the shape of the slit S whose tip is rounded. For example, a shape of only a semicircular portion may be applied to the shape of the slit S whose tip is rounded. When the tip of the slit S is rounded, a split of the sheets 30 and 32 from the portion of the slit S is suppressed.

Fixing positions FP between the first sheet 30 and the second sheet 32 are partially provided along the longitudinal direction of the wire-like transmission member 20 in the wiring member 10. The plurality of fixing positions FP are provided at intervals along the longitudinal direction. The fixing positions FP are provided on both sides of the slit S along the longitudinal direction. That is to say, the first sheet 30 and the second sheet 32 are fixed in positions on the both sides of the slit S along the longitudinal direction. The side edge of the first sheet 30 and the side edge of the second sheet 32 are wholly fixed in the positions other than the slit S.

When the side edge of the first sheet 30 and the side edge of the second sheet 32 are continuously fixed, avoided is that they are fixed at the position where the slit S is formed. The slit S is formed, thus suppressed is an erroneous fixation of a position in the side edge of the first sheet 30 and the side edge of the second sheet 32 designed not to be fixed.

Any of the fixing structures described above as the fixing structure of fixing the wire-like transmission member 20 and the sheets 30 and 32 can be adopted as a fixing structure of fixing the plurality of sheets 30 and 32. For example, the contact area fixation may be applied to the fixing structure of the plurality of sheets 30 and 32 is the contact area fixation, and any of the contact area direct fixation and the contact area indirect fixation is applicable. The fixing structure of the plurality of sheets 30 and 32 may be the same as or different from that of the wire-like transmission member 20 and the sheets 30 and 32.

At least one of the first sheet 30 and the second sheet 32 loosens between the plurality of fixing positions FP. One of the first sheet 30 and the second sheet 32 can be formed longer than the other one by a tolerance thereof in the wiring bodies 12 and 14 before fixation. When the first sheet 30 and the second sheet 32 having different dimensions are overlapped so that four sides thereof fit each other and fixed, the sheet having the larger dimension normally loosens. The sheet with slit or the regular sheet may loosen. Herein, the first sheet 30 as the sheet with slit loosens between the plurality of fixing positions FP along the longitudinal direction, that is to say, the position of the slit S.

The slit S is provided, thus the sheet with slit easily loosens at the position of the slit S. Accordingly, when the plurality of sheets 30 and 32 include both the sheet with slit and the regular sheet, the sheet with slit preferably loosens. A tolerance may be set so that the sheet with slit is equal to or longer than the regular sheet. It is also applicable that when the sheet with slit and the regular sheet are designed to have the same dimension value, for example, a plus tolerance is set to the sheet with slit and a minus tolerance is set to the regular sheet.

An example of managing, the dimension is described. For example, a dimension of the sheets 30 and 32 find a protrusion length of the wire-like transmission member 20 protruding from the sheets 30 and 32 are managed. When both a dimension difference between the first and second sheets 30 and 32 and a dimension difference of the protrusion lengths of the wire-like transmission members 20 protruding from the sheets 30 and 32 are large, a deviation between the position of the end portion of the first wire-like transmission member 20A and the position of the end portion of the second wire-like transmission member 20B increases, and it may be hard to insert the wire-like transmission member 20 into the connector C. On this point, herein, the dimension difference between the first and second sheets 30 and 32 can be absorbed, thus it is sufficient that the protrusion lengths of the wire-like transmission members 20 from the sheets 30 and 32 are managed to an extent that the wire-like transmission member 20 can be inserted into the connector C. Specifically, when the tolerance of the sheets 30 and 32 is d1 and the tolerance of the protrusion lengths of the wire-like transmission members 20 protruding from the sheets 30 and 32 is d2, a total tolerance is d1+d2. When the dimension difference between the first and second sheets 30 and 32 is not absorbed, d1+d2 needs to be designed to be equal to or smaller than a threshold value so that the end portion of the wire-like transmission member 20 can be inserted into the connector C. That is to say, values of d1 and d2 need to be small. In contrast, when the dimension difference between the first and second sheets 30 and 32 is absorbed, the tolerance which needs to be managed to be able to insert the end portion of the wire-like transmission member 20 into the connector C is only d2. That is to say, it is sufficient that d2 is designed to be equal to or smaller than the threshold value described above. Thus, d1 and d2 can be set to be large compared with a case where the dimension difference between the first and second sheets 30 and 32 is not absorbed.

In manufacturing the wiring member 10, the first wiring body 12 and the second wiring body 14 are preferably stacked after manufacturing the first wiring body 12 and the second wiring body 14. In fixing the first sheet 30 and the second sheet 32 which are stacked, for example, the first sheet 30 and the second sheet 32 may be sequentially fixed from the end portion toward the position of the slit S after four sides thereof are fixed. It is also applicable that, for example, the first sheet 30 and the second sheet 32 are sequentially fixed from the other end side toward the position of the slit S after the first sheet 30 and the second sheet 32 are sequentially fixed from one end side toward the position of the slit S. Accordingly, the dimension difference is easily absorbed in the position of the slit S. Long sides of the sheets 30 and 32 tend to loosen more in the position of the slit S before fixation in the first sheet 30 and the second sheet 32.

According to the wiring member 10 having the above configuration, the dimension difference between the sheets 30 and 32 can be absorbed in the position where the sheets 30 and 32 are not fixed to each other. Particularly, in the present example, the dimension difference between the sheets 30 and 32 can be absorbed in the first and second sheets 30 and 32 as the wire material fixing sheets.

At least one of the first sheet 30 and the second sheet 32 is the sheet with slit, thus the position where the sheets 30 and 32 are not fixed can be easily set to the position of the slit S, and the position where the sheets 30 and 32 are not fixed can be easily managed.

The first sheet 30 and the second sheet 32 are fixed in the positions on the both sides of the slit S along the longitudinal direction, thus the range of fixing the first sheet 30 and the second sheet 32 can be increased.

Even in the case where the dimensions of the first sheet 30 and the second sheet 32 are different from each other, the loosening portions are provided in the sheets 30 and 32, thus the difference of the dimensions can be easily absorbed.

Embodiment 2

Figure 6:
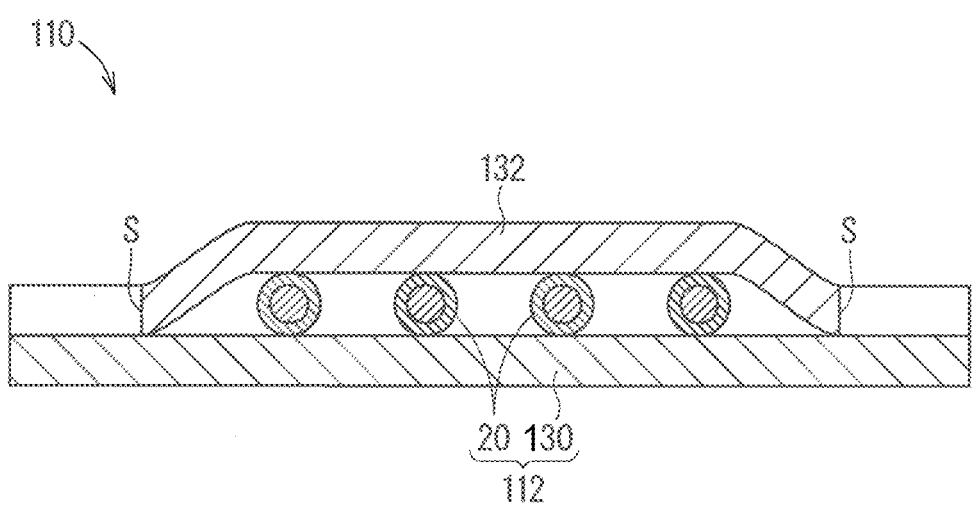
FIG. 6 is a cross-sectional view illustrating a wiring member according to an embodiment 2.

A wiring member according to an embodiment 2 is described. FIG. 6 is a cross-sectional plan view illustrating a wiring member 110 according to the embodiment 2. In the following description of the present embodiment, the same reference numerals are assigned to the similar constituent elements described above, and the description thereof will be omitted.

The wiring member 110 includes a wire-like transmission member 20 and a plurality of sheets 130 and 132. The plurality of sheets 130 and 132 include a first sheet 130 and a second sheet 132. The first sheet 130 and the second sheet 132 are stacked on each other. The wire-like transmission member 20 is fixed to the first sheet 130. The second shed 132 covers the wire-like transmission member 20 from a side opposite to the first sheet 130. The fixing positions FP between the first sheet 130 and the second sheet 132 are partially fixed along the longitudinal direction of the wire-like transmission member 20.

In the present example, the first sheet 130 is the wire material fixing sheet. The wire-like transmission member 20 is not fixed to the second sheet 132. That is to say, the second sheet 132 is the cover sheet.

The cover sheet covers the wire-like transmission member 20 fixed to the wire material fixing sheet from a side opposite to the wire material fixing sheet. The cover sheet may be wholly or partially overlapped with the wire material fixing sheet. The cover sheet may be a sheet formed by the same material as that of the wire material fixing sheet, or a material different from that of the wire material fixing sheet. The cover sheet may be a resin sheet. For example, the cover sheet may be formed by resin such as PVC, PE, PP, or PET in the manner similar to the wire material fixing sheet. One of the wire material fixing sheet and the cover sheet member may be softer than the other one of them. The softness herein, or rigidity conversely, may also be evaluated by Rockwell hardness, for example. For example, it is applicable that a fourth sheet 236 is formed by a material such as rigid PVC, nylon, PET, or PP, and the wire material fixing sheet is a soft member made up of a sheet-like member formed by soft PVC and a non-woven cloth formed by PET stacked on each other.

In the wiring member 110, the second sheet 132 as the cover sheet is provided on one wiring body 112. A configuration similar to that of the wiring member 10 described above can be adopted to the configuration of the wiring member 110 except that the second sheet 132 is the cover sheet.

In the example illustrated in FIG. 6, the slit S is formed in the second sheet 132 as the cover sheet, however, this configuration is not necessary. The slit S may be formed in the first sheet 130 as the wire material fixing sheet. The slit S may be formed in both the first sheet 130 and the second sheet 132. When the cover sheet is harder than the wire material fixing sheet, the wire material fixing sheet is preferably formed to be longer than the cover sheet before fixation. In this case, the wire material fixing sheet preferably loosens between the fixing positions after fixation.

Also according to the wiring member 110 having the above configuration, the dimension difference between the sheets 130 and 132 can be absorbed in the positions where the sheets 130 and 132 are not fixed to each other. Particularly, in the present example, the dimension difference between the sheets 130 and 132 can be absorbed between the wire material fixing sheet and the cover sheet.

Embodiment 3

Figure 7:
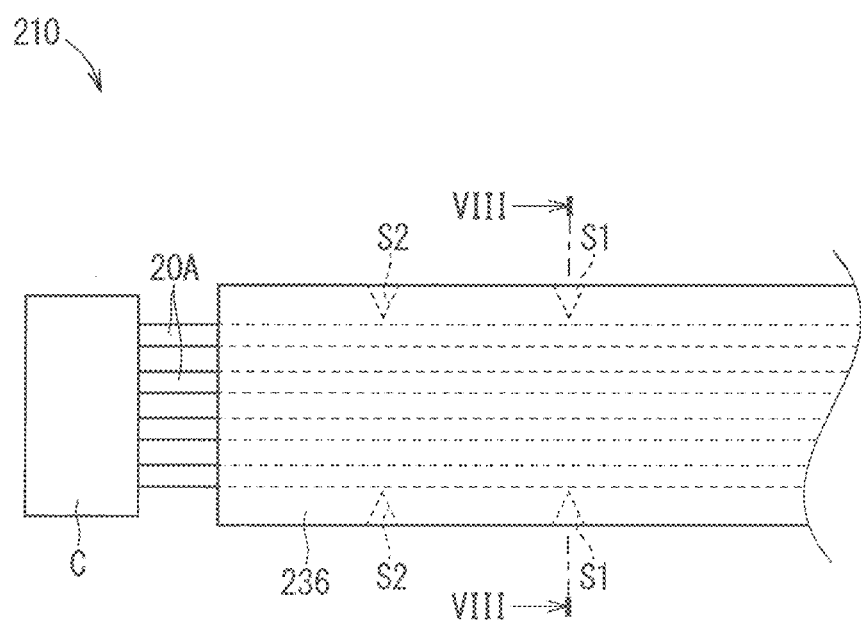
FIG. 7 is a plan view illustrating a wiring member according to an embodiment 3.
Figure 8:
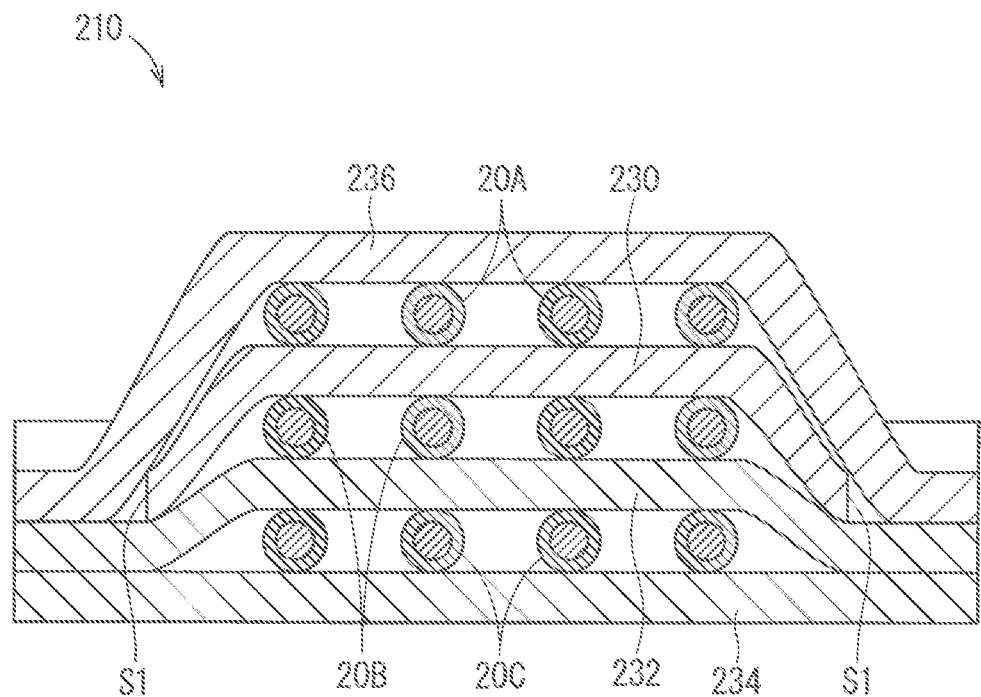
FIG. 8 is a cross-sectional view of the wiring member cut along a VIII-VIII line in FIG. 7.

A wiring member according to an embodiment 3 is described. FIG. 7 is a plan view illustrating a wiring member 210 according to the embodiment 3. FIG. 8 is a cross-sectional view of the wiring member cut along a VIII-VIII line in FIG. 7. FIG. 9 is an explanation diagram illustrating a manufacture of the wiring member 210 according to the embodiment 3. In the following description of the present embodiment, the same reference numerals are assigned to the similar constituent elements described above, and the description thereof will be omitted.

The wiring member 210 of the present example is different from the wiring members 10 and 110 according to the embodiments 1 and 2 described above in that wiring bodies 212, 214, and 216 are stacked in three or more layers.

In the wiring member 210 of the present example, the first wiring body 212, the second wiring body 214, and the third wiring body 216 are stacked in this order.

Slits S1 and S2 are formed in a first sheet 230 of the first wiring body 212 and a second sheet 232 of the second wiring body 214, respectively. That is to say, both the first sheet 230 and the second sheet 232 are sheets with slit. A position of the slit S1 formed in the first sheet 230 and a position of the slit S2 formed in the second sheet 232 are provided apart from each other along the longitudinal direction. The positions of the slits S1 and S2 are provided apart from each other in this manner, positions where the sheets 230 and 232 are not fixed can be easily provided apart from each other. Accordingly, even in a case where a loosening occurs in a position where the sheets are not fixed and is thickened, concentrative increase in thickness in one position is suppressed. The configuration that the position of the slit S1 formed in the first sheet 230 and the position of the slit S2 formed in the second sheet 232 are provided apart from each other along the longitudinal direction is appropriate for the wiring member 210 in which the wiring bodies are stacked in three or more layers. The configuration that the position of the slit formed in the first sheet and the position of the slit formed in the second sheet are provided apart from each other along the longitudinal direction may be applied to the wiring members 10 and 110 in which the wiring bodies are stacked in two layers or less.

The third wiring body 216 includes a third wire-like transmission member 20C and a third sheet 234. The third wire-like transmission member 20C is fixed to the third sheet 234. The slits S1 and S2 are not formed in the third sheet 234. The third sheet 234 is a regular sheet.

A fourth sheet 236 is stacked on the first wiring body 212. The wire-like transmission member 20 is not fixed to the fourth sheet 236. The fourth sheet 236 is a cover sheet. The slits S1 and S2 are not formed in the fourth sheet 236. The fourth sheet 236 is a regular sheet. A configuration similar to that of the second sheet 132 in the embodiment 2 as the cover sheet can be adopted as the fourth sheet 236.

Two sheet portions stacked and fixed are provided in positions of the slits S1 and S2 in the sheets with slit in the plurality of sheets 230, 232, 234, and 236. Accordingly, suppressed is that the portion of the side edge is opened in the positions of the slits S1 and S2 in the sheets with slit. Herein, the second sheet 232 and the fourth sheet 236 are fixed in the position of the slit S1 formed in the first sheet 230. The first sheet 230 and the third sheet 234 are fixed in the position of the slit S2 formed in the second sheet 232.

The sheet located as an uppermost layer in the plurality of sheets 230, 232, 234, and 236 is an uppermost layer sheet. The sheet located as a lowermost layer in the plurality of sheets 230, 232, 234, and 236 is a lowermost layer sheet. The sheet located between the uppermost layer and the lowermost layer in the plurality of sheets 230, 232, 234, and 236 is an intermediate layer sheet. At this time, it is preferable that the uppermost layer sheet and the lowermost layer sheet are regular sheets and at least one of the intermediate layer sheets is a sheet with slit. Accordingly, suppressed is that the portion of the side edge is opened in the wiring member 210. Herein, the fourth sheet 236 is the uppermost layer sheet. The third sheet 234 is the lowermost layer sheet. The first sheet 230 and the second sheet 232 are the intermediate layer sheet. As described above, the third sheet 234 and the fourth sheet 236 are the regular sheets. The first sheet 230 and the second sheet 232 are the sheet with slit. Even when the slits S1 and S2 are formed in the intermediate layer sheets 230 and 232, the uppermost layer sheet 236 and the lowermost layer sheet 234 as the regular sheets can be located in the positions of the slits S1 and S2. Accordingly, the opening in the positions of the slits S1 and S2 is suppressed.

In manufacturing the wiring member 210, the first wiring body 212, the second wiring body 214, and the third wiring body 216 are preferably stacked after manufacturing the first wiring body 212, the second wiring body 214, and the third wiring body 216. When the first wiring body 212, the second wiring body 214, and the third wiring body 216 are stacked, an order of fixing the first sheet 230, the second sheet 232, the third sheet 234, and the fourth sheet 236 is not particularly limited. For example, the first wiring body 212 is overlapped with the second wiring body 214 and fixed thereto after the second wiring body 214 is overlapped with the third wiring body 216 and fixed thereto.

Modification Example

Figure 10:
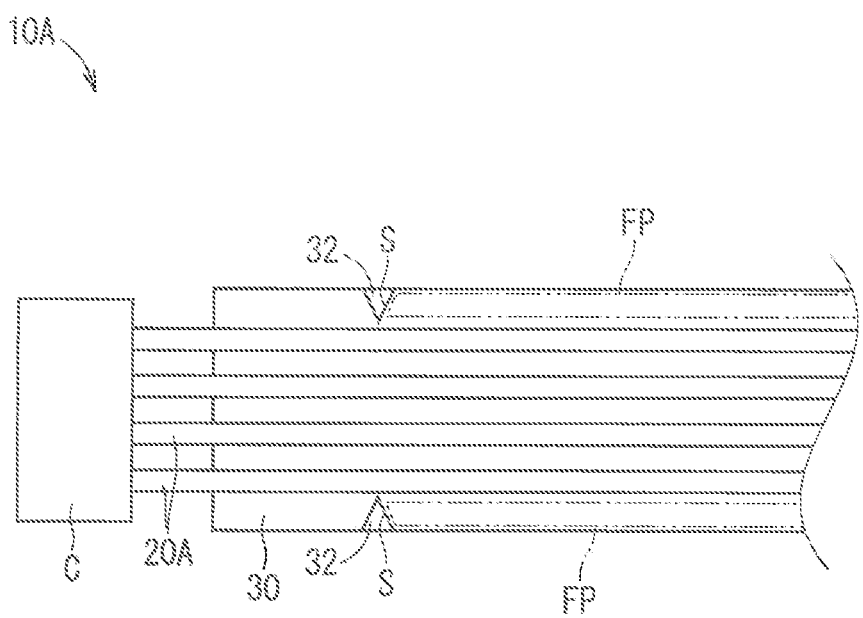
FIG. 10 is a plan view illustrating a modification example of the wiring member according to the embodiment 1.

FIG. 10 is a modification example of the wiring member 10 according to the embodiment 1.

In the wiring member IDA illustrated in FIG. 10, the position of the fixing position FP is different from the fixing position FP in the wiring member 10. in the wiring member 10A, the first sheet 30 and the second sheet 32 are fixed only in one of the positions on the both sides of the slit S along the longitudinal direction. In this case, the slit S can serve as a guideline of the portion where the first sheet 30 and the second sheet 32 are fixed to each other and the portion where they are not fixed. In the example illustrated in FIG. 10, a side of the connector C is not fixed in the positions on the both sides of the slit S along the longitudinal direction, however, a side opposite to the side of the connector C may be fixed.

In the embodiments 1 and 3, the plurality of wiring bodies are stacked so that the sheet and the wire-like transmission member 20 are alternately overlapped with each other, however, this configuration is not necessary.

For example, the first sheets 30 and 230 and the second sheets 32 and 232 may be stacked without sandwiching the first wire-like transmission member 20A and the second wire-like transmission member 20B therebetween. In other words, one main surfaces of the second sheets 32 and 232 to which the wire-like transmission member 20 is fixed face the first sheets 30 and 230 in the embodiments 1 and 3, however, this configuration is not necessary. The other main surface of the second sheets 32 and 232 to which the wire-like transmission member 20 is not fixed may face the first sheet 30. In this case, the first wire-like transmission member 20A and the second wire-like transmission member 20B are outwardly disposed.

For example, the first sheets 30 and 230 and the second sheets 32 and 232 may be stacked to sandwich the first wire-like transmission member 20A and the second wire-like transmission member 20B therebetween. In other words, the other main surface of the first sheets 30 and 230 face the second sheets 32 and 232 in the embodiments 1 and 3, however, this configuration is not necessary. One main surfaces of the first sheets 30 and 230 may face the second sheets 32 and 232. In this case, the first wire-like transmission member 20A and the second wire-like transmission member 20B are inwardly disposed to face each other. In this case, the second wire-like transmission member 20B may be housed between the first wire-like transmission members 20A, or the first wire-like transmission member 20A may be housed between the second wire-like transmission members 20B in some cases. The first wire-like transmission member 20A and the second wire-like transmission member 20B may have contact with each other in some cases. The first wire-like transmission member 20A may have contact with the second sheets 32 and 232 or the second wire-like transmission member 20B may have contact with the first sheets 30 and 230 in some cases.

In the above description, the slit is formed in at least one of the first sheet and the second sheet, and the first sheet and the second sheet are not fixed in the position of the slit, however, this configuration is not necessary. It is also applicable that the first sheet, and the second sheet are the regular sheets, and a portion where the sheets are not fixed may be provided in a part of the regular sheet along the longitudinal direction.

Each configuration described in the above embodiments and modification examples thereof can be appropriately combined as long as they are not contradictory.

EXPLANATION OF REFERENCE SIGNS

10, 10A, 110, 210 wiring member
12, 212 first wiring body
112 wiring body
14, 214 second wiring body
216 third wiring body
20 wire-like transmission member
20A first wire-like transmission member
20B second wire-like transmission member
20C third wire-like transmission member
22 core wire
24 covering layer
30 first sheet (sheet with slit)
32 second sheet (regular sheet)
130 first sheet (sheet with slit)
132 second sheet (regular sheet)
230 first sheet (sheet with slit, intermediate layer sheet)
232 second sheet (sheet with slit, intermediate layer sheet)
234 third sheet (regular sheet, lowermost layer sheet)
236 fourth sheet (regular sheet, uppermost layer sheet)
S, S1, S2 slit
FP fixing position

The invention claimed is:

1. A wiring member, comprising:
a plurality of wire-like transmission members including a first wire-like transmission member and a second wire-like transmission member; and
a plurality of sheets including a first sheet and a second sheet stacked on each other, wherein
the first wire-like transmission member is fixed to the first sheet,
the second wire-like transmission member is fixed to the second sheet,
at least one fixing position between the first sheet and the second sheet is partially provided along a longitudinal direction of the wire-like transmission members,
the at least one fixing position includes a plurality of fixing positions,
the plurality of fixing positions are provided at intervals along the longitudinal direction, and
at least one of the first sheet and the second sheet loosens between the plurality of fixing positions.

2. A wiring member, comprising:
a wire-like transmission member; and
a plurality of sheets including a first sheet and a second sheet stacked on each other, wherein
the wire-like transmission member is fixed to the first sheet,
the second sheet covers the wire-like transmission member from a side opposite to the first sheet,
at least one fixing position between the first sheet and the second sheet is partially fixed along a longitudinal direction of the wire-like transmission member,
the plurality of sheets include a sheet with slit in which a slit is formed in a side edge,
at least one of the first sheet and the second sheet is the sheet with slit, and a side edge of the first sheet and a side edge of the second sheet are fixed to each other.

3. A wiring member comprising:
a plurality of wire-like transmission members including a first wire-like transmission member and a second wire-like transmission member; and
a plurality of sheets including a first sheet and a second sheet stacked on each other, wherein
the first wire-like transmission member is fixed to the first sheet,
the second wire-like transmission member is fixed to the second sheet,
at least one fixing position between the first sheet and the second sheet is partially provided along a longitudinal direction of the wire-like transmission members,
the plurality of sheets include a sheet with slit in which a slit is formed in a side edge,
at least one of the first sheet and the second sheet is the sheet with slit, and
a side edge of the first sheet and a side edge of the second sheet are fixed to each other.

4. The wiring member according to claim 3, wherein
both the first sheet and the second sheet are the sheets with slit, and
a position of the slit formed in the first sheet and a position of the slit formed in the second sheet are provided apart from each other along the longitudinal direction.

5. The wiring member according to claim 3, wherein
the first sheet and the second sheet are fixed to each other in positions on both sides of the slit along the longitudinal direction.

6. The wiring member according to claim 3, wherein
the first sheet and the second sheet are fixed to each other only in one of positions on both sides of the slit along the longitudinal direction.

7. The wiring member according to claim 3, wherein
the plurality of sheets include two sheet portions stacked and fixed in a position of the slit in the sheet with slit.

8. The wiring member according to claim 7, wherein
when a sheet in the plurality of sheets located as an uppermost layer is an uppermost layer sheet, a sheet located as a lowermost layer is a lowermost layer sheet, and at least one sheet located between the uppermost layer and the lowermost layer is at least one intermediate layer sheet,
each of the uppermost layer sheet and the lowermost layer sheet is a regular sheet which does not have the slit in the side edge, and
the at least one intermediate layer sheet is the sheet with slit.

9. A wiring member comprising:
a wire-like transmission member; and
a plurality of sheets including a first sheet and a second sheet stacked on each other, wherein
the wire-like transmission member is fixed to the first sheet,
the second sheet covers the wire-like transmission member from a side opposite to the first sheet,
at least one fixing position between the first sheet and the second sheet is partially fixed along a longitudinal direction of the wire-like transmission member,
the at least one fixing position includes a plurality of fixing positions,
the plurality of fixing positions are provided at intervals along the longitudinal direction, and
at least one of the first sheet and the second sheet loosens between the plurality of fixing positions.

\* \* \* \* \*